(12) United States Patent
Schmiedel et al.

(10) Patent No.: US 10,723,450 B2
(45) Date of Patent: Jul. 28, 2020

(54) PASSIVE PITCH ANGLE ADJUSTMENT APPARATUS

(71) Applicant: AIRBUS HELICOPTERS DEUTSCHLAND GMBH, Donauworth (DE)

(72) Inventors: Patrik Schmiedel, Buchdorf (DE); Harald Leitner, Augsburg (DE); Julian Kraus, Dillingen (DE); Ludwig Dannemann, Augsburg (DE); Uwe Kiesewetter, Rain am Lech (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 23 days.

(21) Appl. No.: 16/284,926

(22) Filed: Feb. 25, 2019

(65) Prior Publication Data
US 2019/0263514 A1 Aug. 29, 2019

(30) Foreign Application Priority Data
Feb. 28, 2018 (EP) .................................. 18400006

(51) Int. Cl.
*B64C 27/72* (2006.01)
*B64C 27/04* (2006.01)
(Continued)

(52) U.S. Cl.
CPC .............. *B64C 27/72* (2013.01); *B64C 27/04* (2013.01); *B64C 27/39* (2013.01); *B64C 27/51* (2013.01);
(Continued)

(58) Field of Classification Search
CPC ...... B64C 2027/7205; B64C 2027/003; B64C 2027/7211; B64C 2027/7216;
(Continued)

(56) References Cited

U.S. PATENT DOCUMENTS 1,909,845 A * 5/1933 Nagler .................. B64C 27/605
416/4
2,672,202 A * 3/1954 Pullin ..................... B64C 27/51
416/117
(Continued)

FOREIGN PATENT DOCUMENTS

DE 102004053001 A1 5/2006
DE 102005007129 A1 8/2006
(Continued)

OTHER PUBLICATIONS

European Search Report for EP 18400006, Completed by the European Patent Office, dated Aug. 22, 2018, All together 7 Pages.

*Primary Examiner* — Nathaniel E Wiehe
*Assistant Examiner* — Ryan C Clark
(74) *Attorney, Agent, or Firm* — Brooks Kushman P.C.

(57) ABSTRACT

A rotor or propeller may have rotor blades and a passive pitch angle adjustment apparatus. The passive pitch angle adjustment apparatus may include levers, rods, and central rod. Levers may be connected to rotor blades and rotate them around a respective pitch axis. Rods may be connected to levers and mechanically link levers with each other via central point that is located outside rotor plane. Central rod may connect central point with base point that is located in a longitudinal direction of rotor axis. The passive pitch angle adjustment apparatus may enable a cyclic pitch adjustment of the rotor blades and block a collective pitch adjustment of the rotor blades.

15 Claims, 6 Drawing Sheets

(51) Int. Cl.
*B64C 27/39* (2006.01)
*B64C 27/59* (2006.01)
*B64C 27/51* (2006.01)
*B64C 27/58* (2006.01)

(52) U.S. Cl.
CPC .............. *B64C 27/59* (2013.01); *B64C 27/58* (2013.01); *B64C 2027/7205* (2013.01)

(58) Field of Classification Search
CPC ......... B64C 27/04; B64C 27/39; B64C 27/57; B64C 27/59; B64C 27/51; B64C 27/58; A64H 27/12
See application file for complete search history.

(56) References Cited

U.S. PATENT DOCUMENTS

| | | | |
|---|---|---|---|
| 2,684,721 A | 7/1954 | Lloyd | |
| 2,946,390 A | 7/1960 | Pozgay | |
| 2,978,037 A * | 4/1961 | Focke | B64C 27/30 |
| | | | 416/40 |
| 2,983,319 A | 5/1961 | Kaman et al. | |
| 3,029,048 A * | 4/1962 | Brooks | B64C 13/30 |
| | | | 244/17.19 |
| 3,105,558 A | 10/1963 | Kell | |
| 3,228,629 A | 1/1966 | Garner | |
| 3,508,841 A | 4/1970 | Derschmidt | |
| 3,556,674 A | 1/1971 | Foote | |
| 8,424,799 B2 * | 4/2013 | Popelka | B64C 27/001 |
| | | | 244/17.27 |
| 8,834,128 B2 * | 9/2014 | Kuntze-Fechner | |
| | | | B29C 70/545 |
| | | | 416/230 |
| 10,065,733 B2 * | 9/2018 | Pfaller | B64C 27/33 |
| RE47,176 E * | 12/2018 | Rehkemper | A63H 27/12 |
| 10,377,478 B2 * | 8/2019 | Muren | B64C 27/51 |
| 2016/0236773 A1 | 8/2016 | Jolly et al. | |
| 2018/0002008 A1 | 1/2018 | Muren et al. | |

FOREIGN PATENT DOCUMENTS

| | | |
|---|---|---|
| EP | 1985536 A2 | 10/2008 |
| GB | 576876 | 4/1946 |
| GB | 612688 | 11/1948 |
| GB | 662319 | 12/1951 |
| GB | 807423 | 1/1959 |
| WO | 2011058447 A2 | 5/2011 |
| WO | 2011058447 A3 | 5/2011 |

* cited by examiner

PASSIVE PITCH ANGLE ADJUSTMENT APPARATUS

CROSS-REFERENCE TO RELATED APPLICATIONS

This application claims priority to European patent application No. EP 18400006.5 filed on Feb. 28, 2018, the disclosure of which is incorporated in its entirety by reference herein.

BACKGROUND OF THE INVENTION

(1) Field Of The Invention

The invention is related to rotors and propellers, and, more particularly, to a passive pitch angle adjustment apparatus for controlling the pitch angle of the rotor blades of a rotor or propeller.

(2) Description Of Related Art

Rotors are usually provided for producing thrust in a predetermined direction during operation. The thrust produced by the rotor blades of a rotor can be controlled in two different ways: either by controlling the rotation speed of the rotor blades around the rotor axis, or by controlling an aerodynamic lift coefficient of the rotor blades. The aerodynamic lift coefficient is usually controlled by adjusting an underlying pitch angle of the rotor blades.

Pitch angle adjustment is also desirable to compensate for asymmetries in air velocity, for example during operation in non-axial inflow fields i.e., when the air flow has a component that is perpendicular to the rotor plane and at the same time a component that is lateral to the rotor plane. In non-axial inflow fields, some rotor blades are rotating against the lateral air flow while others are rotating with the lateral air flow, which leads to unbalanced lift at the different rotor blades, depending on their current position. Unbalanced lift often leads to vibratory stresses on the rotor blades. Controlling the pitch angle of each rotor blade separately according to its rotation position, which is sometimes also referred to as "cyclic pitch control" or "cyclic pitch actuation", may lead to an evenly distributed lift on all rotor blades.

Controlling the pitch angle of rotor blades requires the active or passive control of flexible joints in rotor assemblies. In actively controlled rotor assemblies, each associated rotor blade is articulated and controlled individually over its azimuth angle of rotation, which often requires complex, heavy, and cost intensive pitch adjustment devices that require active control means with external energy supplies to adjust the pitch angle of each rotor blade individually.

Actively controlled rotor assemblies are usually not only provided with cyclic, but also with collective pitch adjustment devices in order to be effective regarding lift and drag. Examples for actively controlled rotor assemblies with pitch adjustment devices are described in documents U.S. Pat. No. 2,684,721, EP 1 985 536, DE 10 2005 007 129, DE 10 2004 053 001, U.S. Pat. Nos. 3,556,674, 3,228,629, GB 576 876, GB 612 688, GB 662 319, GB 807 423, and U.S. Pat. No. 3,508,841.

However, the cyclic and collective pitch adjustment devices are generally embodied with a comparatively great complexity and weight and require the implementation of cost-intensive, complex controlling mechanisms and surveillance means. More specifically, the cyclic and collective pitch adjustment devices usually comprise pitch control rods that are moved by a swashplate, or by an axially moveable ring around a respective rotor mast. These elements need to be moved by additional actuators, which therefore create extra costs including recurring costs for maintenance.

The document U.S. Pat. No. 3,105,558 describes a passively actuated rotor assembly. More specifically, a variable pitch propeller is described that includes a hub having a straight spline connection with a centrally arranged drive shaft. The hub has an intermediate annular groove within which a pair of radially extending bearing struts are disposed. A blade support is journaled in a cup-shaped recess of each bearing strut by a roller bearing assembly. The root ends of the propeller blades are threadedly connected with the blade supports. The shank portion of each propeller blade is mounted within a control sleeve and keyed thereto. Each control sleeve is thus connected to rotate with its respective propeller blade about the longitudinal axis thereof. The propeller blades have equal areas on both sides of their longitudinal axes and thus may be termed balanced propeller blades. The hub is enclosed by a two-part housing including a front section and a rear section, the sections being connected together by bolts. The parting line between the sections is coincident with the longitudinal axes of the propeller blades, and the outer end of each bearing strut is received in a slot formed in the front and rear sections and at the parting line therebetween. The hub is restrained against axial movement relative to the drive shaft by a nut which threadedly engages the shaft and abuts the front end of the hub. The housing is bearing supported on the hub by front and rear needle thrust bearings and front and rear radial bearings. The hub has a pair of bearing recesses, each of which receives a ball-like formation of a crank arm integral with each control sleeve. Each control sleeve is formed with a pair of substantially radial extensions, or abutments, wherein first extensions are engageable with the hub for determining the minimum pitch position of the propeller blades, and second extensions are engageable with the hub at the maximum pitch position. Each extension is formed with a ball socket for receiving a ball-like formation on the end of an associated link. The other end of the associated link has a ball-like formation which is disposed within a socket of a thrust ring. The thrust ring is supported for axial movement within the rear section of the propeller housing, which contains a prestressed elastomeric ring. The thrust ring has a tang disposed in an axial slot in the housing section and thus is slidable axially relative thereto. The ring may be composed of rubber or any other suitable plastic having a controlled density whereby its elastic and deformation characteristics are such as to match the torque characteristics of the propeller. The propeller blades are retained in their maximum pitch positions by the prestressed elastomeric ring. When the drive shaft is rotated in the clockwise direction, rotation about the horizontal propeller axis is imparted to the blades and hence the propeller housing through the cranks on the control sleeves. The initial pre-stressing of the elastomeric ring acts in opposition to the torque input during normal operation. However, when the engine is accelerated such as during take-off, or climbing, the increased input torque to which the blades are subjected rotates the blades about their longitudinal axes towards their minimum pitch positions whereat the first extensions engage the hub. During rotation of the propeller blades about their axes in the clockwise direction, the elastomeric ring is deformed due to movement of the thrust ring. The thrust ring also functions to coordinate the pitch adjusting movement of the two propeller blades. The variation in the pitch position of the propeller is responsive solely to the input torque of the drive shaft. Thus, when the input torque is reduced to the normal operating range, the elastomeric ring will reposition the propeller blades at their maximum pitch position where the second extensions engage the hub.

However, due to a comparatively high number of constituent components, this variable pitch propeller has a pitch adjustment mechanism that is comparatively complex, heavy, and cost intensive. Furthermore, this pitch adjustment mechanism is only suitable for a high stiffness rotor assembly, where a respective frequency of the first lead-lag eigenmode, i. e. bending of the rotor blades within the plane of rotation relative to an associated rotor hub, is larger than two times a given rotational frequency of the rotor assembly.

This is, however, not applicable to large rotor assemblies, as the provided high stiffness leads to high bending loads, which would be prohibitively large. Furthermore, even for comparatively small rotor assemblies with a diameter of less than 2 m, occurring loads may become prohibitively large if the rotor assemblies are used in conditions with comparably large lateral flow speeds, i.e. with an angle between flow direction and rotation axis of more than 15°. This is generally the case for all rotorcrafts.

Accordingly, the pitch adjustment mechanism according to document U.S. Pat. No. 3,105,558 can generally not be applied to rotorcrafts. Exceptions may be rotorcrafts that fly at low speeds only, i. e. speeds of less than 50 kt, and that are equipped with a comparatively large number of small rotor assemblies, i. e. more than six rotor assemblies, or that are generally provided with comparatively small overall dimensions, i. e. a maximum takeoff weight of less than 500 kg.

Document U.S. Pat. No. 2,978,037 describes a stabilizing system for adjusting simultaneously (a) collectively the pitch of the blades of a helicopter rotor, and (b) the cyclic pitch variation of the blade or several blades thereof. The stabilizing system comprises a simple arrangement of an inner and an outer annular member. The inner annular member can rotate around a fixed eccentric axis. The outer annular member is rotatably disposed about the inner annular member and connected by articulated linking members to the blades of a helicopter rotor for variation of the pitch of the latter. The rotor further comprises rod means for indicating the inclination of the blade cone and for automatically converting that inclination into a simultaneous interdependent adjustment of the collective pitch and the individual pitch variation of the rotor blades. In other words, the tilting of the whole blade cone is used as an input for balancing lift forces, and the stabilizing system is working in one flight direction only due to the fixed position of the eccentric axis. Therefore, the effects of sidewinds or a sideward flight cannot be recovered by this stabilizing system.

The document US2016236773 describes controlling vibration generated by loads in a helicopter rotor hub. The hub has a rotor including a plurality of fluidic or fluid-elastic pitch adjusters. The adjusters are each connected about the hub between one of a corresponding plurality of blades, via a pitch horn attached to each blade and to a swash plate. The pitch adjusters are each tube elements hosting a dynamic link element and an elastomeric element allowing axial compression and extension of the corresponding pitch adjusters, provoking relative pitch movement of a respective one of blades. Thus, a tailored dynamic response at given frequencies enables the blades to dynamically pitch in this frequency range in response to aerodynamic loads such that transmitted loads and moments in the rotor hub are reduced.

Document U.S. Pat. No. 2,983,319 describes a mechanism for substantially eliminating the rotor produced harmonic vibrations that occur during operation in non-axial inflow fields through pitch changes of the rotor blades that are timed and of such magnitude that they cancel or substantially cancel the vibrations. The mechanism includes rigid bodies that are connected by movable hinges and performs a passive pitch angle adjustment through a mechanical coupling with the rotation of the rotor driving shaft. In some embodiments, the pitch movement is introduced at the tip of each rotor blade by an aerodynamic flap. In other embodiments, the pitch movement is introduced at the root of each rotor blade and forced to a frequency which is coupled with the rotation of the driving shaft by a gear box.

BRIEF SUMMARY OF THE INVENTION

Based on the limitations and drawbacks of the prior art, an objective is to provide a passive pitch angle adjustment apparatus for a rotor having rotor blades. The passive pitch angle adjustment apparatus should use the existing aerodynamic forces of a rotating rotor with at least two rotor blades as input signal and as actuation forces to provide torsion moments on the rotor blade axis of the respective rotor blade and thereby an adjustment of the pitch angle of the respective rotor blade. The passive pitch angle adjustment apparatus should be relatively simple, lightweight, and have low purchase and maintenance costs while not requiring any active control means. The passive pitch angle adjustment apparatus should provide an increased efficiency of the rotor system in case of lateral air flow with reduced bending moments and vibration on the rotor head and rotor axis due to balanced lift forces.

These objectives are solved by a passive pitch angle adjustment apparatus comprising the features of claim 1.

More specifically, a passive pitch angle adjustment apparatus for a rotor with rotor blades that rotate around a rotor axis in a rotor plane may include first and second levers, first and second rods, and a central rod. The first lever may be connected to a first rotor blade of the rotor blades and rotate the first rotor blade around a first pitch axis. The second lever may be connected to a second rotor blade of the rotor blades and rotate the second rotor blade around a second pitch axis. The first and second rods may mechanically link the first and second levers via a central point that is located outside the rotor plane. The central rod may connect the central point with a base point that is located in a longitudinal direction of the rotor axis, wherein a change of a first pitch angle of the first rotor blade in reaction to aerodynamic forces causes a first rotation of the first rotor blade around the first pitch axis, and wherein the first lever through the first rod, the second rod, and the second lever in connection with the central rod adjusts a second pitch angle of the second rotor blade through a second rotation of the second rotor blade with the second lever around the second pitch axis.

According to one aspect, the first rotor blade may have a center of lift that is offset from the first pitch axis and create a torsion moment that rotates the first lever around the first pitch axis in reaction to the aerodynamic forces thereby causing the change of the first pitch angle.

According to one aspect, the first lever through the first rod, the second rod, and the second lever in connection with the central rod may cause an increase of the second pitch angle in response to a reduction of the first pitch angle and a reduction of the second pitch angle in response to an increase of the first pitch angle.

According to one aspect, the passive pitch angle adjustment apparatus may further include a third lever and a third rod. The third lever may be connected to a third rotor blade of the rotor blades and rotate the third rotor blade around a third pitch axis. The third rod may, together with the first and second rods, mechanically link the third lever to the first and second levers via the central point.

According to one aspect, the first lever, the first rod, the second rod, and the second lever in connection with the central rod may enable a cyclic pitch adjustment of the rotor blades and block a collective pitch adjustment of the rotor blades.

According to one aspect, a first attachment of the first lever with the first rod and a second attachment of the second lever with the second rod may perform a nearly linear movement, and the central point may perform a spherical movement around the base point.

According to one aspect, the first and second rods are flat straps made from a composite material.

According to one aspect, fibers of the composite material from the first rod may extend into the second rod such that the first and second rods form a single coupling connection.

According to one aspect, the single coupling connection is twisted by 90 degrees between a first attachment of the first lever with the first rod and the central point and between a second attachment of the second lever with the second rod and the central point.

According to one aspect, the passive pitch angle adjustment apparatus may further include a dampening device that is coupled between the central rod and the base point, wherein the dampening device introduces a phase shift when, in response to the change of the first pitch angle, the first lever through the first rod, the second rod, and the second lever in connection with the central rod adjusts the second pitch angle.

According to one aspect, the central rod may have an enlarged foot, and the dampening device may further include an elastic plate that is connected to the enlarged foot and enables an inclination of the central rod at the base point in any direction.

According to one aspect, the passive pitch angle adjustment apparatus may further include weights that are connected with the central rod at a predetermined distance from the central rod and achieve a stabilizing momentum on the central rod.

According to one aspect, the rotor may further include first and second rigid arms that connect the first and second rotor blades to a rotor hub and bearings that are connected to the first and second rigid arms to enable flap and pitch movements of the first and second rotor blades.

According to one aspect, the rotor may further include first and second flexible arms that connect the first and second rotor blades to a rotor hub and enable flap and pitch movements of the first and second rotor blades through elastic deformation.

Furthermore, a rotorcraft may have at least one passive pitch angle adjustment apparatus as described above.

BRIEF DESCRIPTION OF THE DRAWINGS

Embodiments are outlined by way of example in the following description with reference to the attached drawings. In these attached drawings, identical or identically functioning components or elements are labeled with identical reference numbers and characters and are, consequently, only described once in the following description.

DETAILED DESCRIPTION OF THE INVENTION

Figure 1:
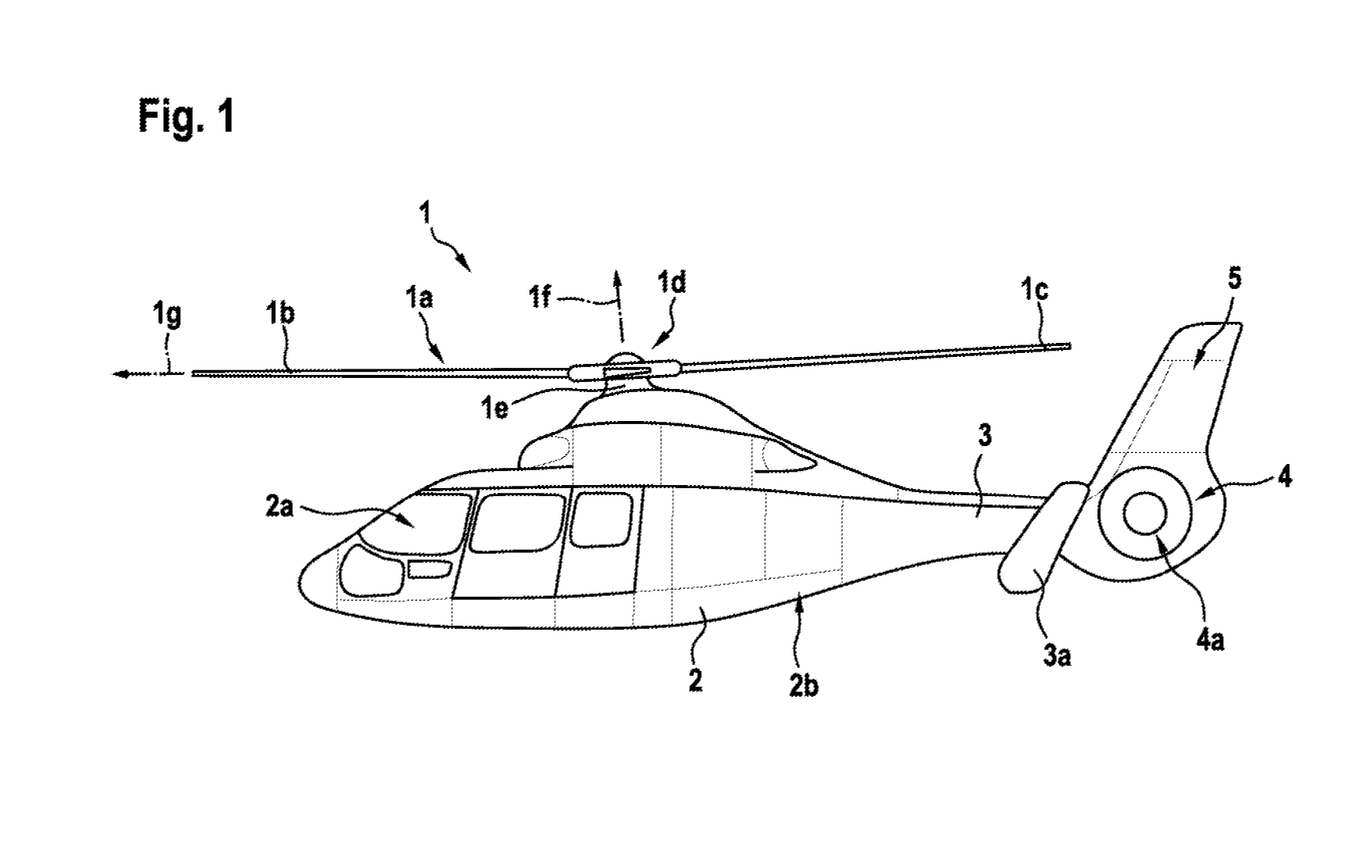
FIG. 1 is a diagram of an illustrative rotary wing aircraft in accordance with some embodiments.

Exemplary embodiments may be included with any rotor or propeller having at least two rotor blades. For example, embodiments may be included in a rotor or a propeller of a transportation vehicle, if desired. FIG. 1 shows an example of a transportation vehicle. A transportation vehicle may be an airplane, a quadcopter, a helicopter, or any other rotary wing transportation vehicle. As shown in FIG. 1, the transportation vehicle may be a rotorcraft 1 that is exemplarily illustrated as a helicopter. Thus, for purposes of simplicity and clarity, the rotorcraft 1 is hereinafter referred to as the "helicopter" 1.

Illustratively, helicopter 1 may have a fuselage 2 that forms an airframe of the helicopter 1. The fuselage 2 is connected to a suitable landing gear and exemplarily forms a cabin 2a and a rear fuselage 2b. The rear fuselage 2b is connected to a tail boom 3.

Illustratively, helicopter 1 may have at least one multi-blade rotor 1a for providing lift and forward or backward thrust during operation. The at least one multi-blade rotor 1a comprises a plurality of rotor blades 1b, 1c that are mounted at an associated rotor head 1d to a rotor shaft 1e, which rotates in operation of the helicopter 1 around an associated rotor axis if in a rotor plane 1g.

By way of example, helicopter 1 may include at least one counter-torque device 4 configured to provide counter-torque during operation, i.e. to counter the torque created by rotation of the at least one multi-blade rotor 1a for purposes of balancing the helicopter 1 in terms of yaw. If desired, counter-torque device 4 may be shrouded. The at least one counter-torque device 4 is illustratively provided at an aft section of the tail boom 3 and may have a tail rotor 4a. The aft section of the tail boom 3 may include a fin 5. Illustratively, the tail boom 3 may be provided with a suitable horizontal stabilizer 3a.

Figure 2:
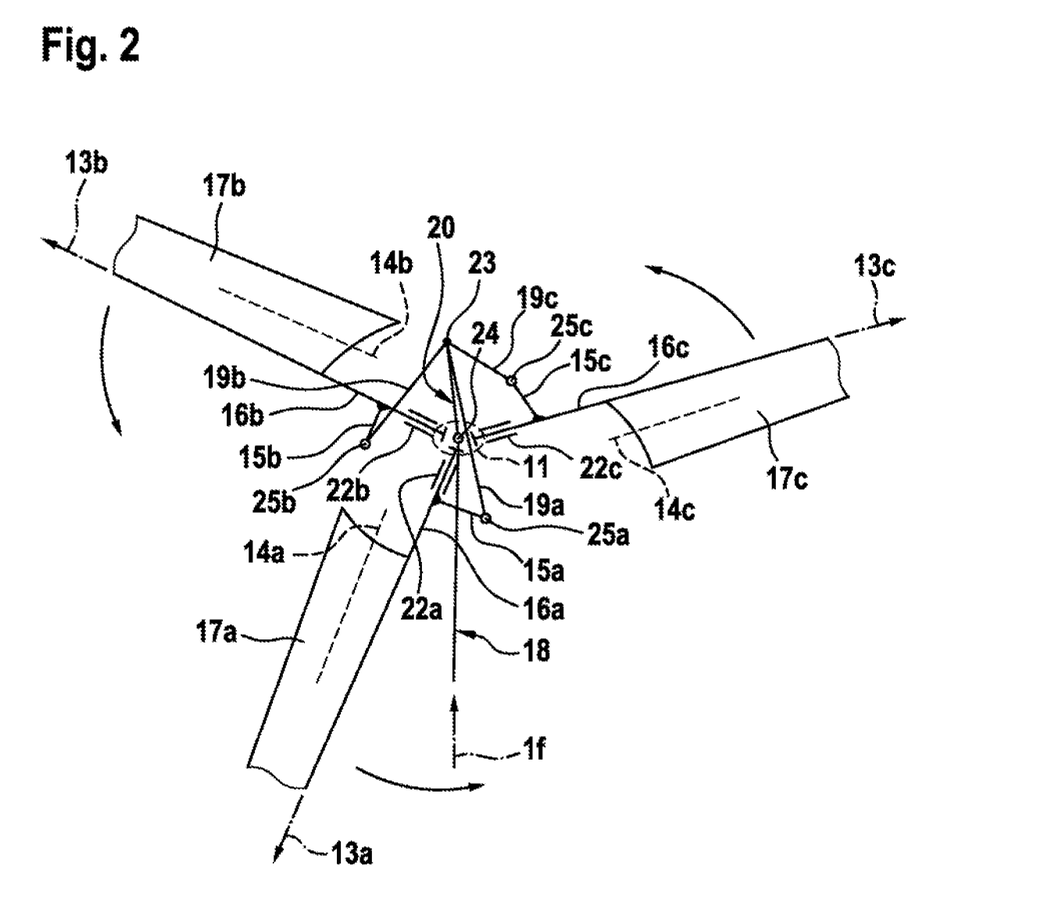
FIG. 2 is a diagram of an illustrative passive pitch angle adjustment apparatus with bearings between rotor blades and a rotor hub in accordance with some embodiments.

If desired, the at least one multi-blade rotor 1a and/or the tail rotor 4a may include a passive pitch angle adjustment apparatus for adjusting the pitch angle of the respective rotor blades. FIG. 2 shows an illustrative passive pitch angle adjustment apparatus for a rotor.

As shown in FIG. 2, the rotor may include rotor shaft 18, rotor hub 11, rotor blades 17a, 17b, 17c, rigid arms 16a, 16b, 16c to which rotor blades 17a, 17b, 17c are connected, respectively, and bearings 22a, 22b, 22c between rigid arms 16a, 16b, 16c and rotor hub 11 to enable flap movements around respective flap axes and pitch movements of rotor blades 17a, 17b, 17c around respective pitch axes 13a, 13b, 13c.

The passive pitch angle adjustment apparatus may include levers 15a, 15b, 15c, rods 19a, 19b, 19c, and central rod 20. Levers 15a, 15b, 15c may be connected to rotor blades 17a, 17b, 17c and rotate rotor blades 17a, 17b, 17c around the respective pitch axis 13a, 13b, 13c. Rods 19a, 19b, 19c may be connected to levers 15a, 15b, 15c at respective lever-rod attachments 25a, 25b, 25c and mechanically link levers 15a, 15b, 15c with each other via central point 23 that is located outside rotor plane 1g. Central rod 20 may connect central point 23 with base point 24 that is located in a longitudinal direction of the rotor axis 1f. The passive pitch angle adjustment apparatus may enable a cyclic pitch adjustment of the rotor blades and block a collective pitch adjustment of the rotor blades.

During operation of the rotor, rotor blades 17a, 17b, 17c rotate around rotation axis 1f, and aerodynamic forces may act on the center of lift 14a, 14b, 14c of the respective rotor blades 17a, 17b, 17c. Rotor blades 17a, 17b, 17c may have a center of lift 14a, 14b, 14c that is offset from pitch axis 13a, 13b, 13c, and the aerodynamic forces may create a torsion moment that rotates levers 15a, 15b, 15c around the respective pitch axis 13a, 13b, 13c. As an example, consider the scenario in which aerodynamic forces cause a change in lift of rotor blade 17a leading to a rotation of rotor blade 17a around pitch axis 13a, thereby causing a change of the pitch angle of rotor blade 17a. In this scenario, lever 15a through rod 19a, rods 19b, 19c, and levers 15b, 15c in connection with central rod 20 may adjust the pitch angles of rotor blades 17b, 17c, respectively, through a rotation of rotor blades 17b, 17c with levers 15b, 15c around pitch axis 13b, 13c.

Figure 3:
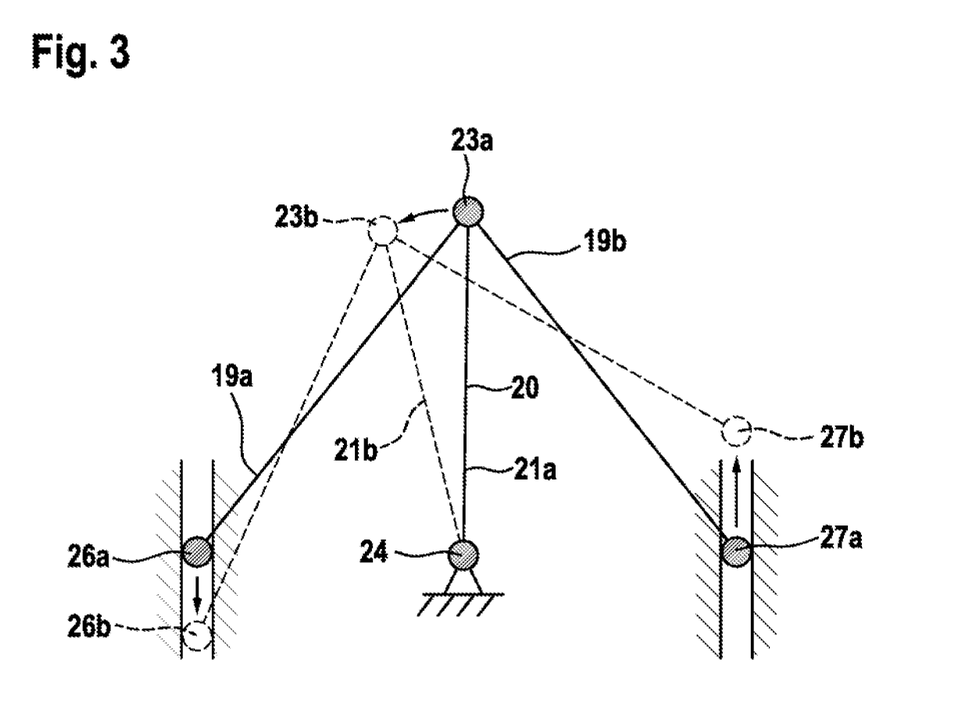
FIG. 3 is a diagram of illustrative spherical movements of a central point and illustrative nearly linear movements of lever-rod attachments in accordance with some embodiments.

In some embodiments, adjusting the pitch angles of rotor blades 17b, 17c in response to a pitch angle change of rotor blade 17a may involve predetermined movements of lever-rod attachments 25a, 25b, 25c and/or predetermined movements of central point 23. FIG. 3 is a diagram of illustrative spherical movements of a central point and illustrative nearly linear movements of two lever-rod attachments in accordance with some embodiments.

As shown in FIG. 3, central rod 20 may be in position 21a and connect base point 24 with the central point that is in position 23a. Rods 19a, 19b may be linked at the central point and connected to levers at respective lever-rod attachments that are in lever-rod attachment positions 26a and 27a, respectively.

Consider the scenario in which aerodynamic forces cause a change in lift of a rotor blade. For example, aerodynamic forces may increase the lift of the rotor blade, leading to a rotation of the rotor blade around a pitch axis, thereby causing a change of the pitch angle of the rotor blade. As an example, an increase in lift of rotor blade 17a of FIG. 2 may rotate rotor blade 17a clockwise around pitch axis 13a. In this scenario, lever 15a that links rotor blade 17a to rod 19a may cause lever-rod attachment 25a to move downward. As shown in FIG. 3, the lever-rod attachment may move from lever-rod attachment position 26a to lever-rod attachment position 26b. The movement between lever-rod attachment positions 26a and 26b may be a nearly linear movement that, through rod 19a, may move, central rod 20 from central rod position 21a to central rod position 21b. Since central rod 20 is connected to base point 24, the central point may perform a spherical movement around base point 24 from central point position 23a to central point position 23b. The movement of the central point from central point position 23a to central point position 23b may, through rod 19b, cause the lever-rod attachment of rod 19b with a lever to perform a nearly linear movement from lever-rod attachment position 27a to lever-rod attachment position 27b. As an example, lever-rod attachment 25b of FIG. 2 may cause lever 15b to move upwards, which may cause a rotation of rotor blade 17b counter clockwise around pitch axis 13b, leading to an increase in lift of rotor blade 17b.

In some scenarios, aerodynamic forces may decrease the lift of a rotor blade, leading to a rotation of the rotor blade around a pitch axis, thereby causing a change of the pitch angle of the rotor blade. As an example, a decrease in lift of rotor blade 17b of FIG. 2 may rotate rotor blade 17b counter clockwise around pitch axis 13b. In this scenario, lever 15b that links rotor blade 17b to rod 19b may cause lever-rod attachment 25b to move upward. As shown in FIG. 3, the lever-rod attachment may move from lever-rod attachment position 27a to lever-rod attachment position 27b. The movement between lever-rod attachment positions 27a and 27b may be a nearly linear movement that, through rod 19b, may move, central rod 20 from central rod position 21a to central rod position 21b. Since central rod 20 is connected to base point 24, the central point may perform a spherical movement around base point 24 from central point position 23a to central point position 23b. The movement of the central point from central point position 23a to central point position 23b may, through rod 19a, cause the lever-rod attachment of rod 19a with a lever to perform a nearly linear movement from lever-rod attachment position 26a to lever-rod attachment position 26b. As an example, lever-rod attachment 25a of FIG. 2 may cause lever 15a to move upwards, which may cause a rotation of rotor blade 17a clockwise around pitch axis 13a, leading to a decrease in lift of rotor blade 17a.

In other words, aerodynamic forces may cause a change in lift at one or more rotor blades of a rotor or propeller, which may cause a pitch angle change of the corresponding rotor blade. The passive pitch angle adjustment apparatus described above may transfer this pitch angle change to the other rotor blades. For example, a rotor blade with high lift (e.g., a rotor blade that rotates against the flight direction of helicopter 1 of FIG. 1) may reduce its pitch angle. The passive pitch angle adjustment apparatus may transform the pitch angle reduction of the rotor blade through a mechanical coupling mechanism into a pitch angle increase of the other rotor blades (i.e., of the rotor blades that have a lower lift). Therefore, the passive pitch angle adjustment apparatus provides a pitch-pitch coupling between the rotor blades, which leads to an automatic balancing of lift over all rotor blades of the rotor or propeller and therefore to a more efficient rotor or propeller in non-axial inflow fields (e.g., in case of lateral air flow during forward flight of a helicopter such as helicopter 1 of FIG. 1).

Figure 4:
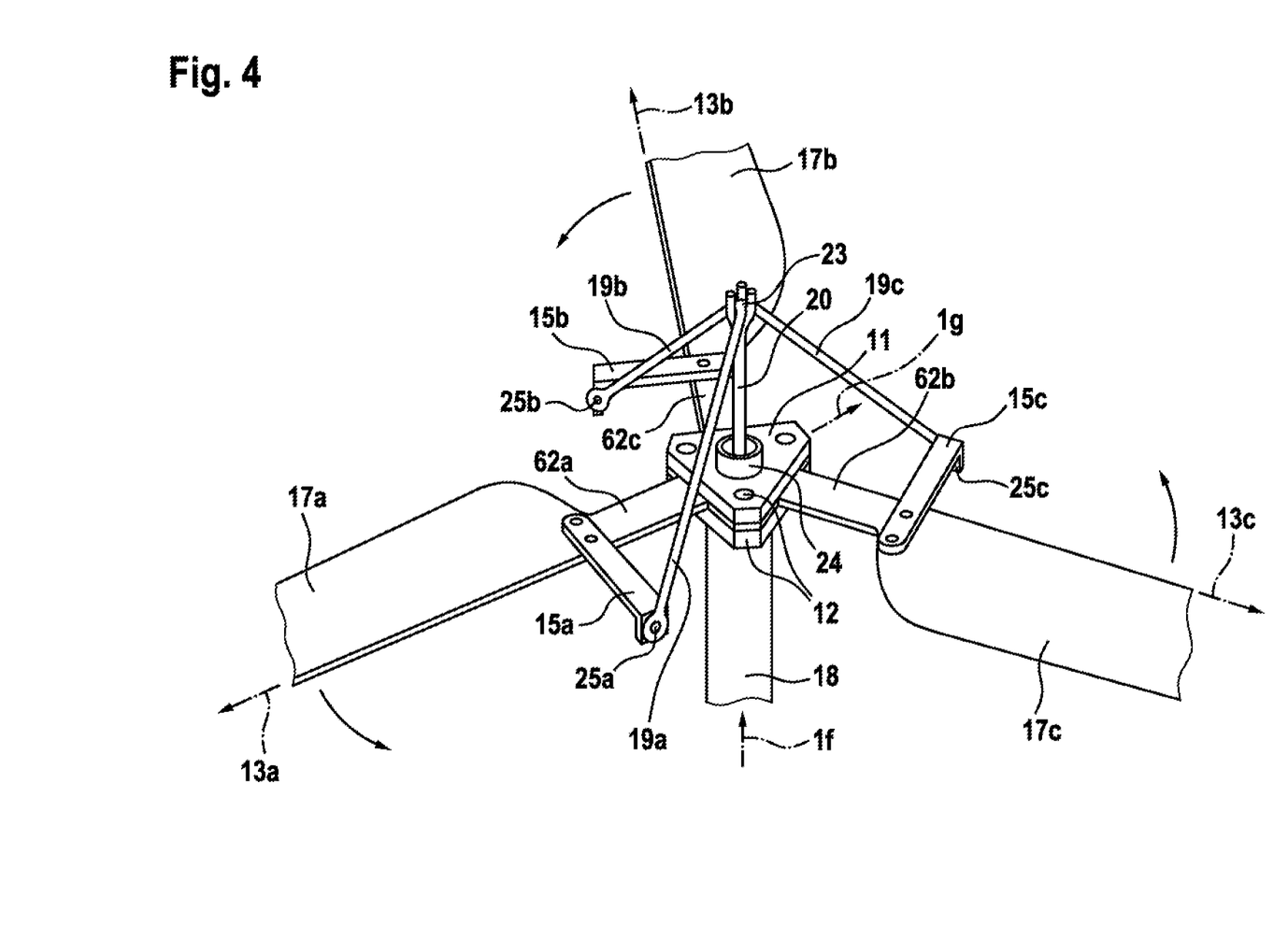
FIG. 4 is a diagram of an illustrative passive pitch angle adjustment apparatus with flexible arms between rotor blades and a rotor hub in accordance with some embodiments.

In some embodiments, the rotor or propeller may have flexible arms between rotor blades and a rotor hub. FIG. 4 is a diagram of an illustrative passive pitch angle adjustment apparatus with flexible arms between rotor blades and a rotor hub in accordance with some embodiments.

As shown in FIG. 4, the rotor may include rotor shaft 18, rotor hub 11, rotor blades 17a, 17b, 17c, flexible arms 62a, 62b, 62c between rotor hub 11 and rotor blades 17a, 17b, 17c, respectively, to enable flap movements around respective flap axes and pitch movements of rotor blades 17a, 17b, 17c around the respective pitch axes 13a, 13b, 13c.

The passive pitch angle adjustment apparatus may include levers 15a, 15b, 15c, rods 19a, 19b, 19c, and central rod 20. Levers 15a, 15b, 15c may be connected with rotor blades 17a, 17b, 17c and/or flexible arms 62a, 62b, 62c and rotate rotor blades 17a, 17b, 17c around the respective pitch axis 13a, 13b, 13c. Rods 19a, 19b, 19c may be connected to levers 15a, 15b, 15c at respective lever-rod attachments 25a, 25b, 25c and mechanically link levers 15a, 15b, 15c with each other via central point 23 that is located outside the rotor plane (i.e., in front, behind, above, below, left, or right of the rotor plane, or any combination thereof, based on the perspective and the mounting of the rotor). Central rod 20 may connect central point 23 with base point 24 that is located in a longitudinal direction of the rotor axis 1f. In some embodiments, base point 24 may be located in the rotor plane. If desired, base point 24 may be located outside the rotor plane.

Figure 5:
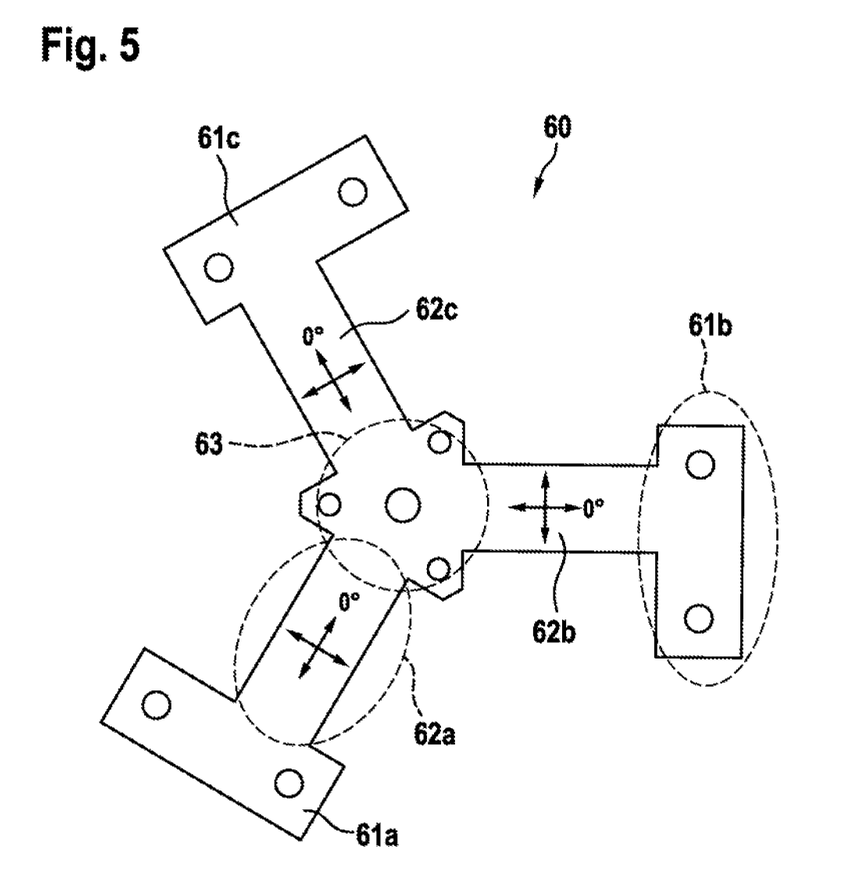
FIG. 5 is a diagram of illustrative plate with flexible arms that connect respective rotor blade attachments for receiving rotor blades with a middle part that is mountable to a rotor hub in accordance with some embodiments.

FIG. 5 is a diagram of illustrative plate 60 with flexible arms 62a, 62b, 62c that connect respective rotor blade attachments 61a, 61b, 61c for receiving rotor blades with a middle part 63 that is mountable to a rotor hub such as rotor hub 11 of FIG. 4 in accordance with some embodiments. As shown in FIG. 5, flexible arms 62a, 62b, 62c may enable flap movements and pitch movements of rotor blades that are attached to rotor blade attachments 61a, 61b, 61c. If desired, rotor blade attachments 61a, 61b, 61c may receive levers such as levers 15a, 15b, 15c of FIG. 4, respectively.

Flexible arms 62a, 62b, 62c may have a rectangular cross section with a width (i.e., the dimension in direction of the flap axis) that is significantly bigger than the height (i.e., the dimension perpendicular to the flap and the pitch axis) to enable a flap motion and minimize a lead-lag motion of the rotor blades.

In some embodiments, flexible arms 62a, 62b, 62c may be made from a composite material. Constituent materials of the composite material may include core materials, matrix materials, which are sometimes also referred to as matrix phase or background materials, and transforming materials, which are sometimes also referred to as reinforcements or reinforcing phase. Examples for core materials include polyurethane (PU) foam, polyvinyl chloride (PVC) foam, or other foams, honeycomb cores, woods, just to name a few. Examples for reinforcements may include fibers and fabrics such as glass fibers, carbon fibers, flax, textiles, ceramic fibers, as well as carbon nanotubes, etc. Examples for matrix materials include resins, polymers, ceramics, etc. In some embodiments, plate 60 is made in one piece using a composite material.

If desired, flexible arms 62a, 62b, 62c may include fibers or other reinforcements that are oriented in direction from middle part 63 to rotor blade attachments 61a, 61b, 61c (i.e., in direction of the pitch axis) and perpendicular to this direction (i.e., in direction of the flap axis). Flexible arms 62a, 62b, 62c may have a relatively high bending stiffness for flap movements of the rotor blades and a relatively low bending stiffness for pitch movements of the rotor blades, if desired. In some embodiments, a dedicated lay-up may provide a tailored stiffness for each deflection direction. For example, middle part 63 and/or rotor blade attachments 61a, 61b, 61c may be laminated with a close to quasi-isotropic lay-up. If desired, middle part 63 and/or rotor blade attachments 61a, 61b, 61c may be thicker than flexible arms 62a, 62b, 62c.

Fasteners may attach middle part 63 between clamps 12 of rotor hub 11 of FIG. 4. If desired, fasteners may attach rotor blades 17a, 17b, 17c and/or levers 15a, 15b, 15c of FIG. 4 to rotor blade attachments 61a, 61b, 61c of FIG. 5. Fasteners may include bolts and nuts, rivets, screws, clips, or any other types of fasteners that may be suitable to attach middle part 63 between clamps 12 and/or rotor blades 17a, 17b, 17c and/or levers 15a, 15b, 15c to rotor blade attachments 61a, 61b, 61c.

Figure 6:
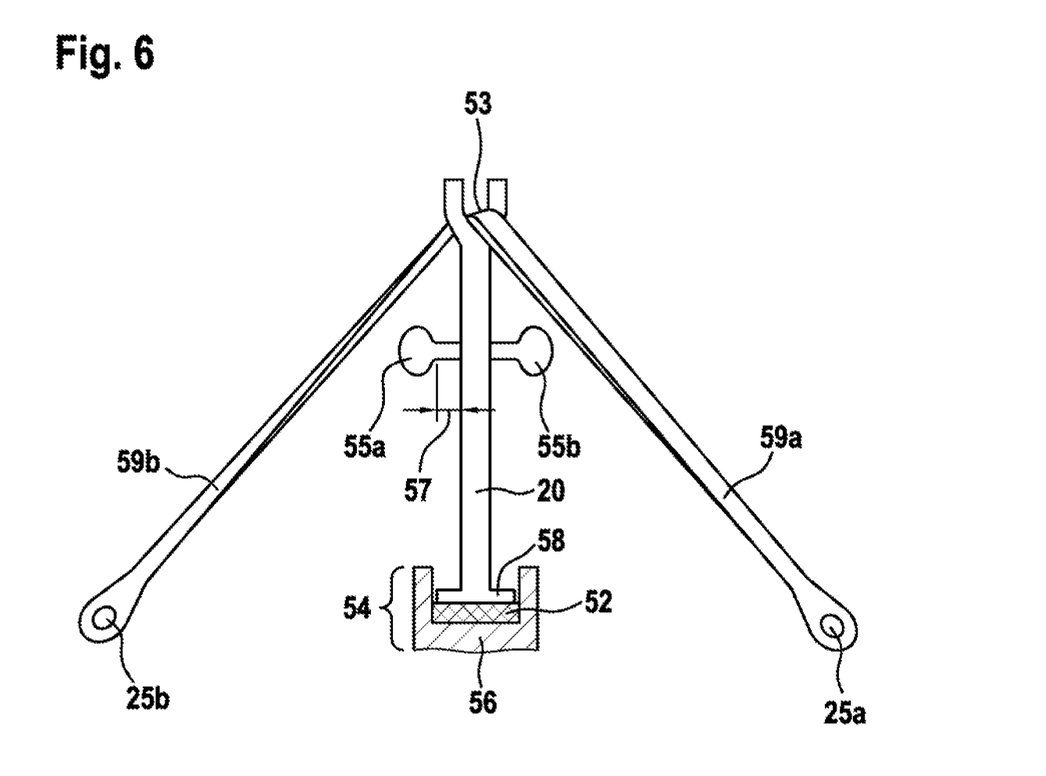
FIG. 6 is a diagram of an illustrative passive pitch angle adjustment apparatus with a dampening device between a central rod and a base point and illustrative rods made from two flat straps that form a single coupling connection in accordance with some embodiments.

In some embodiments, a passive pitch angle adjustment apparatus, such as the passive pitch angle adjustment apparatus of FIG. 4, may include a component that performs a phase shift in control input. Such a component may include a dampening device and/or weights attached to the central rod. FIG. 6 is a diagram of an illustrative passive pitch angle adjustment apparatus with a dampening device between a central rod and a base point.

As shown in FIG. 6, the passive pitch angle adjustment device may include central rod 20, dampening device 54 coupled between central rod 20 and base point 56, and rods 59a, 59b that connect lever-rod attachments 25a, 25b with each other via central point 53.

Dampening device 54 may include enlarged foot 58 of central rod 20 and elastic plate 52. Elastic plate 52 may be made from any material that enables an inclination of central rod 20 at base point 56 in any direction without significant friction effects. For example, elastic plate 52 may include elastomers, such as natural rubber, synthetic rubber, or any other elastic material that is suitable to introduce a phase shift when, in response to the change of a pitch angle, a lever through rods 59a, 59, and the second lever in connection with the central rod adjusts the second pitch angle.

In some embodiments, elastic plate 53 may encapsulate enlarged foot 58 of central rod 20. For example, elastic plate 53 may completely surround enlarged foot 58, thereby providing a positioning in all directions. If desired, elastic plate 53 may include two or more components that clamp enlarged foot 58 from top and bottom.

In some embodiments, the passive pitch angle adjustment device may include weights 55a, 55b. Weights 55a, 55b may be connected with central rod 20 at a predetermined distance 57 from the central rod. As an example, the predetermined distance 57 of weights 55a, 55b from central rod 20 may be selected to effectively use the Coriolis effect and achieve a stabilizing momentum on the central rod 20.

Rods 59a, 59b may be made from two flat straps. The two flat straps may form a single coupling connection between lever-rod attachments 25a and 25b. For example, the two flat straps that form rods 59a, 59b may be made from a composite material, and the fibers or other reinforcements of the composite material from rod 59a may extend into rod 59b such that rods 59a, 59b form a single coupling connection. If desired, the straps may be oriented horizontally at central point 53, and each strap of the single coupling connection may be twisted by 90 degrees between central point 53 and a respective lever-rod attachment 25a, 25b.

It should be noted that the above described embodiments are merely described to illustrate possible embodiments of the present invention, but not in order to restrict the present invention thereto. Instead, multiple modifications and variations of the above described embodiments are possible and should, therefore, also be considered as being part of the invention.

For instance, the bearings 22a, 22b, and 22c may be hinges. The passive pitch angle adjustment apparatus of FIG. 3 or 6 may have as many rods and lever-rod attachments as the corresponding rotor has rotor blades. For example, the passive pitch angle adjustment apparatus of FIG. 3 or 6 may have two, three, four, or five rods and lever-rod attachments, or any other number that is greater than or equal to two. Similarly, the rotor and passive pitch angle adjustment apparatus of FIG. 2 or 4 and/or plate 60 may accommodate a number of rotor blades, levers, and rods that is different than three. For example, the rotor and passive pitch angle adjustment apparatus of FIG. 2 or 4 and/or plate 60 may have two, four, five, or six of each of rotor blades, levers, and rods, or any number of each of rotor blades, levers, and rods that is greater than or equal to two. Moreover, in FIG. 2 or 4, levers 15a, 15b, 15c are shown in direction of the leading edges of rotor blades 17a, 17b, 17c, respectively. If desired, levers 15a, 15b, 15c may be connected in direction of the trailing edges of rotor blades 17a, 17b, 17c, respectively.

REFERENCE LIST 1 rotary wing aircraft
1a multi-blade rotor
1b, 1c rotor blades
1d rotor head
1e rotor shaft
1f rotor axis
1g rotor plane
2 fuselage
2a cabin
2b rear fuselage
3 tail boom
3a horizontal stabilizer
4 counter-torque device
4a tail rotor
5 fin
11 rotor hub
12 clamp
13a, 13b, 13c pitch axis
14a, 14b, 14c center of lift
15a, 15b, 15c lever
16a, 16b, 16c rigid arm
17a, 17b, 17c rotor blade
18 rotor shaft
19a, 19b, 19c rod
20 central rod
21a, 21b central rod position
22a, 22b, 22c bearing
23, 23a, 23b central point
24 base point
25a, 25b, 25c lever-rod attachment
26a, 26b, 27a, 27b lever-rod attachment position
52 elastic plate
53 central point
54 dampening device
55a, 55b weights
56 base point
57 distance
58 enlarged foot
59a, 59b rod
60 plate with flexible arms
61a, 61b, 61c rotor blade attachment
62a, 62b, 62c flexible arm
63 middle part

What is claimed is:

1. A passive pitch angle adjustment apparatus for a rotor with rotor blades that rotate around a rotor axis in a rotor plane, comprising:
   a first lever that is connected to a first rotor blade of the rotor blades and rotates the first rotor blade around a first pitch axis;
   a second lever that is connected to a second rotor blade of the rotor blades and rotates the second rotor blade around a second pitch axis;
   characterized by first and second rods that mechanically link the first and second levers via a central point that is located outside the rotor plane; and
   a central rod that connects the central point with a base point that is located in a longitudinal direction of the rotor axis, wherein a change of a first pitch angle of the first rotor blade in reaction to aerodynamic forces causes a first rotation of the first rotor blade around the first pitch axis, and wherein the first lever through the first rod, the second rod, and the second lever in connection with the central rod adjusts a second pitch angle of the second rotor blade through a second rotation of the second rotor blade with the second lever around the second pitch axis.

2. The passive pitch angle adjustment apparatus of claim 1, wherein the first rotor blade has a center of lift that is offset from the first pitch axis and creates a torsion moment that rotates the first lever around the first pitch axis in reaction to the aerodynamic forces thereby causing the change of the first pitch angle.

3. The passive pitch angle adjustment apparatus of claim 2, wherein the first lever through the first rod, the second rod, and the second lever in connection with the central rod causes an increase of the second pitch angle in response to a reduction of the first pitch angle and a reduction of the second pitch angle in response to an increase of the first pitch angle.

4. The passive pitch angle adjustment apparatus of claim 1, further comprising:
   a third lever that is connected to a third rotor blade of the rotor blades and rotates the third rotor blade around a third pitch axis; and
   a third rod that, together with the first and second rods, mechanically links the third lever to the first and second levers via the central point.

5. The passive pitch angle adjustment apparatus of claim 1, wherein the first lever, the first rod, the second rod, and the second lever in connection with the central rod enable a cyclic pitch adjustment of the rotor blades and block a collective pitch adjustment of the rotor blades.

6. The passive pitch angle adjustment apparatus of claim 5, wherein a first attachment of the first lever with the first rod and a second attachment of the second lever with the second rod perform a nearly linear movement, and wherein the central point performs a spherical movement around the base point.

7. The passive pitch angle adjustment apparatus of claim 1, wherein the first and second rods are flat straps made from a composite material.

8. The passive pitch angle adjustment apparatus of claim 7, wherein fibers of the composite material from the first rod extend into the second rod such that the first and second rods form a single coupling connection.

9. The passive pitch angle adjustment apparatus of claim 8, wherein the single coupling connection is twisted by 90 degrees between a first attachment of the first lever with the first rod and the central point and between a second attachment of the second lever with the second rod and the central point.

10. The passive pitch angle adjustment apparatus of claim 1, further comprising:
    a dampening device coupled between the central rod and the base point, wherein the dampening device introduces a phase shift when, in response to the change of the first pitch angle, the first lever through the first rod, the second rod, and the second lever in connection with the central rod adjusts the second pitch angle.

11. The passive pitch angle adjustment apparatus of claim 10, wherein the central rod has an enlarged foot and wherein the dampening device further comprises:

an elastic plate that is connected to the enlarged foot and enables an inclination of the central rod at the base point in any direction.

12. The passive pitch angle adjustment apparatus of claim 10, further comprising:

weights that are connected with the central rod at a predetermined distance from the central rod and achieve a stabilizing momentum on the central rod.

13. The passive pitch angle adjustment apparatus of claim 1, wherein the rotor further comprises first and second rigid arms that connect the first and second rotor blades to a rotor hub and bearings that are connected to the first and second rigid arms to enable flap and pitch movements of the first and second rotor blades.

14. The passive pitch angle adjustment apparatus of claim 1, wherein the rotor further comprises first and second flexible arms that connect the first and second rotor blades to a rotor hub and enable flap and pitch movements of the first and second rotor blades through elastic deformation.

15. A rotorcraft with at least one passive pitch angle adjustment apparatus according to claim 1.

\* \* \* \* \*